(No Model.)  
2 Sheets—Sheet 1.

S. H. JENNINGS.
DIE FOR FORMING AUGER HEADS.

No. 469,448.  
Patented Feb. 23, 1892.

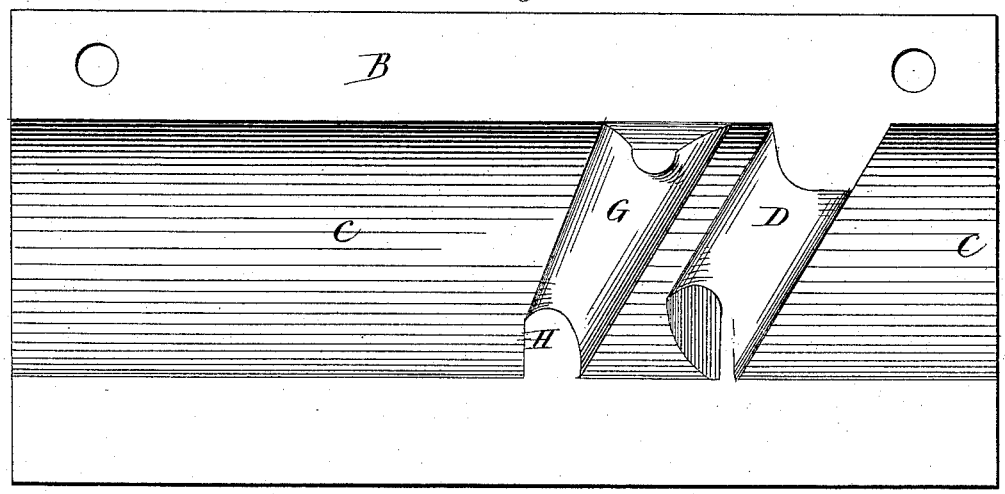
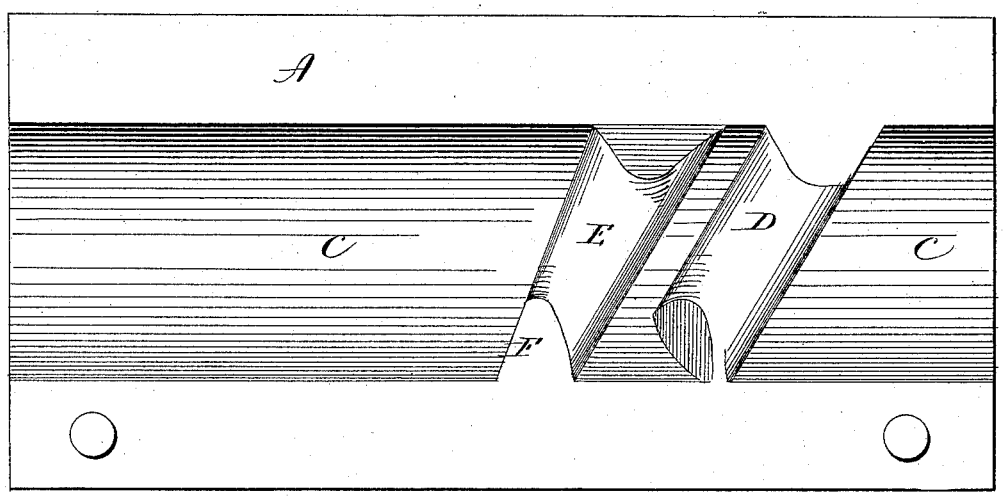

UNITED STATES PATENT OFFICE.

SIMEON H. JENNINGS, OF DEEP RIVER, CONNECTICUT.

DIE FOR FORMING AUGER-HEADS.

SPECIFICATION forming part of Letters Patent No. 469,448, dated February 23, 1892.

Application filed December 14, 1891. Serial No. 414,994. (No model.)

*To all whom it may concern:*

Be it known that I, SIMEON H. JENNINGS, of Deep River, in the county of Middlesex and State of Connecticut, have invented a new Improvement in Dies for Forming Auger-Heads; and I do hereby declare the following, when taken in connection with accompanying drawings and the letters of reference marked thereon, to be a full, clear, and exact description of the same, and which said drawings constitute part of this specification, and represent, in—

Figure 1:
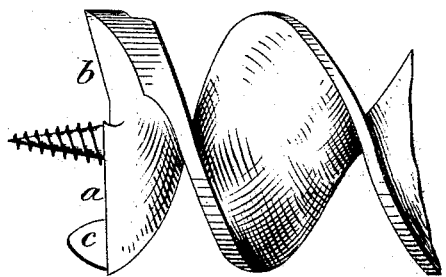
Figure 2:
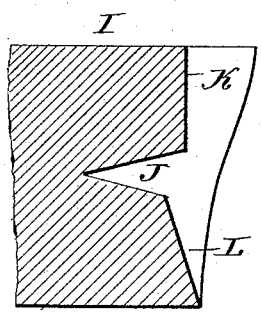
Figure 3:
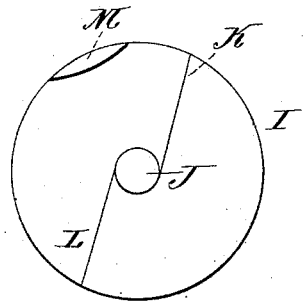

Figure 1, a side view of the head portion of the finished auger; Fig. 2, a longitudinal section of the heading portion of the follower; Fig. 3, a face end view of the follower; Fig. 4, a face view of one part of the die; and Fig. 5, a face view of the other part of the die, the two parts being represented as turned away the one from the other.

This invention relates to the construction of dies for shaping the head of the auger of my invention for which Letters Patent of the United States, No. 433,683, were granted to me, dated August 5, 1890.

The auger for the heading of which the present invention is made is represented in Fig. 1, and its peculiarity consists in the formation of the floor-lips. The auger is a double-twist auger, each twist terminating in a floor-lip. The one lip $a$ is a horizontal lip and of substantially the usual construction; but the other lip $b$ stands in a diagonal plane, crossing the plane of the floor-lip $a$. The object of this diagonal lip is that chips cut by the auger may be divided. The floor-lip $a$ cuts a chip in a horizontal plane; but the lip $b$ cuts in a diagonal plane across that plane cut by the lip $a$. Consequently the one lip $a$ will cut across the oblique surface produced by the lip $b$, and the oblique lip $b$ will cut across the horizontal surface produced by the lip $a$, and so that there will be a continuous division of chips cuts, and which reduces the chips to so small a size that they readily follow out through the twist of the auger without clogging, or the obstruction which usually follows the cut of a plain horizontal floor-lip or one in which the two floor-lips are in planes parallel with each other.

The present invention consists in the construction of dies for the formation of the head of this auger, and as more fully hereinafter described.

The die is made in two parts, A, Fig. 4, representing the one part, and B, Fig. 5, the other part. The two parts are adapted to set together. In each part of the die a longitudinal semicircular cavity C is formed, the two together corresponding to the circumference of the twist of the auger to be headed. Diametrically across each part of the die is a rib D. The inclination and shape of the rib corresponds to the twist of the auger, the inclination in the one part being the reverse of that of the other part, so that when placed together the space between them will form a recess corresponding to the twist of the auger immediately back of the head. The part A is constructed with a second rib E, inclined like the rib D; but the face of this rib is constructed upon its outer side with a diagonal surface F, which corresponds substantially to the inner surface of the oblique or diagonal lip $b$ of the auger. The shape of the remainder of the rib corresponds to the surface of the auger from the edge of the floor-lip onto the twist. The other part B of the die is constructed with a rib G similar to the rib E, but inclined in the opposite direction, as described, regarding the two ribs D D. The outer surface of the rib G and upon the side opposite the inclined surface F of the rib E is constructed to form a horizontal surface H. The horizontal plane of the surface H crosses the plane of the diagonal surface F of the rib E and corresponds to the flat floor-lip $a$ of the auger. The surface of the rib G from this flat surface corresponds to the shape of the twist or blade of the auger from that floor-lip as does the surface F for the rib E.

I, Figs. 2 and 3, represents the follower, which is cylindrical in form and corresponds to the longitudinal cavity C, formed in the dies and so as to be readily forced therein. The inner end of the follower is constructed with a central cavity J, corresponding to the screw-point to be formed on the auger, and on the inner end the follower is constructed with a horizontal surface K, corresponding to the horizontal surface H of the part B of the die, and opposite this horizontal surface the follower is constructed with an oblique surface L, corresponding to the oblique or diagonal surface F of the part A of the dies. The surface of the end of the follower from these inclined and horizontal surfaces is of spiral shape, corresponding to the under side of the blade of the auger from the lips, respectively, and in case the spur c is formed on the auger (see Fig. 1) a corresponding cavity M is made in the side of the follower.

The twisted blank is placed in the die, the die being opened for the purpose and so as to bring that portion of the head which is to form the respective lips against the respective surfaces F H in the die. Then the follower is advanced when its corresponding surfaces K L strike the end of the blade of the auger and operate upon the metal to shape the two portions of the blade corresponding to the said horizontal and diagonal surfaces and so as to produce the horizontal and diagonal floor-lips described.

I claim—

The herein-described dies for forming the heads of augers, the said dies consisting of two parts A B, each part constructed with a longitudinal semicircular groove of a diameter corresponding to the diameter of the auger to be headed, the said grooves constructed with diagonal ribs D, corresponding to one twist of the auger back of the head, and the one part A constructed with a similar diagonal rib having its face constructed with a diagonal surface F, corresponding to the shape of the inside of the diagonal lip of the auger, the other part B constructed with a rib G, corresponding to the rib E of the part A, the said rib G presenting a horizontal surface H, corresponding to the inside of the horizontal floor-lip of the auger, said diagonal surface F being in a plane crossing the plane of the horizontal surface H, combined with a cylindrical follower I, having its end constructed with a horizontal surface K and an opposite diagonal surface L, the said diagonal surface being in a plane across the horizontal plane of the surface K, and crossing, respectively, to the outside of the horizontal and diagonal floor-lips of the auger to be headed, substantially as described.

In testimony whereof I have signed this specification in the presence of two subscribing witnesses.

SIMEON H. JENNINGS.

Witnesses:
R. L. SELDEN, Jr.,
H. J. BROOKS.